United States Patent [19]

Humber

[11] 3,832,405
[45] Aug. 27, 1974

[54] 5-CYCLOALKYLIDENE DIBENZOCYCLOHEPTENE DERIVATIVES

[75] Inventor: Leslie G. Humber, Dollard des Ormeaux, Quebec, Canada

[73] Assignee: American Home Products Corporation, New York, N.Y.

[22] Filed: Apr. 24, 1972

[21] Appl. No.: 246,690

Related U.S. Application Data

[62] Division of Ser. No. 38,571, May 18, 1970, Pat. No. 3,697,581.

[52] U.S. Cl. ......................... 260/612 R, 260/613 R
[51] Int. Cl. ............................................. C07c 43/20
[58] Field of Search ..................... 260/612 R, 613 R

[56] References Cited
UNITED STATES PATENTS 3,270,067  8/1966  Wendler et al. ............ 260/613 R X
3,329,728  7/1967  Hoffsommer et al. ....... 260/613 R X
3,354,206  11/1967  Wendler et al. ............ 260/613 R X
3,383,420  5/1968  Wendler..................... 260/613 R X
3,697,581  10/1972  Humber..................... 260/613 R X Primary Examiner—Bernard Helfin

[57]  ABSTRACT

There are disclosed new derivatives of 5-cyclohexylidene-5H-dibenzo[a,d]cycloheptene which are substituted at either position 2 or at both positions 2 and 8 with hydroxyl, lower acyloxy, or an aminoethoxy radical, such as, diethylaminoethoxy, dimethylaminoethoxy, pyrrolidinoethoxy, piperidinoethoxy or morpholinoethoxy, as well as the acid addition salts with pharmaceutically acceptable acids of those derivatives containing the aminoethoxy radicals. The derivatives are useful as antigonadotrophic agents substantially free from estrogenic effects, and methods for their preparation and use are given.

4 Claims, No Drawings

5-CYCLOALKYLIDENE DIBENZOCYCLOHEPTENE DERIVATIVES

This is a division of application Ser. No. 38,571 filed May 18, 1970, now U.S. Pat. 3,697,581, issued Oct. 10, 1972.

BACKGROUND OF THE INVENTION

This invention relates to new dibenzocycloheptene derivatives, to intermediates used in their preparation and to processes for preparing these derivatives.

The dibenzocycloheptene derivatives of this invention possess antigonadotrophic activity at doses which are substantially free of estrogenic activity. This feature makes these compounds suitable for treating menopausal symptoms in cases where estrogen therapy is contraindicated; for example, in women with a previous history of fibroids of the uterus.

SUMMARY OF THE INVENTION

The dibenzocycloheptene derivatives of this invention may be represented by formula I,

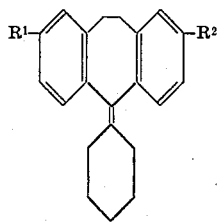

in which $R^1$ represents a hydrogen and $R^2$ represents the radical, hydroxyl, lower acyloxy, for example, acetoxy, propionyloxy or butyryloxy, diethylaminoethoxy, dimethylaminoethoxy, pyrrolidinoethoxy, piperidinoethyoxy or morpholinoethoxy; or $R^1$ and $R^2$ each represent the same radical selected from the radicals described above for $R^2$.

DETAILED DESCRIPTION OF THE INVENTION

The dibenzocycloheptene derivatives of this invention possess antigonadotropic activity. More particularly, these derivatives exhibit potent oral and parenteral activity when tested in standard pharmacologic tests for antigonadotrophic activity, such as, for example the test described by C. Revesz and C. I. Chappel, J. Reprod. Fert., Vol. 12, p. 473 (1966). On the other hand, the substantial absence of estrogenic effects at doses used to elicit antigonadotrophic effects may be readily demonstrated in standard laboratory tests for estrogenic activity, for example, the uterotrophic assay described by B. L. Rubins et al., Endocrinol., Vol. 49, p. 429 (1951).

When the compounds of this invention are employed as antigonadotrophic agents in warm-blooded animals, e.g. rats, alone or in combination with pharmacologically acceptable carriers, their proportion is respectively determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.5 mg. to about 25 mg per kilo per day, although as aforementioned variations will occur. However, a dosage level that is in the range of from about 2.5 mg to about 10 mg per kilo per day is most satisfactory. Such doses may be administered once or twice a day as required.

The dibenzocycloheptene derivatives of this invention of formula I in which $R^1$ is hydrogen and $R^2$ is as defined in the first instance may be prepared by the process illustrated by FIG. 1.

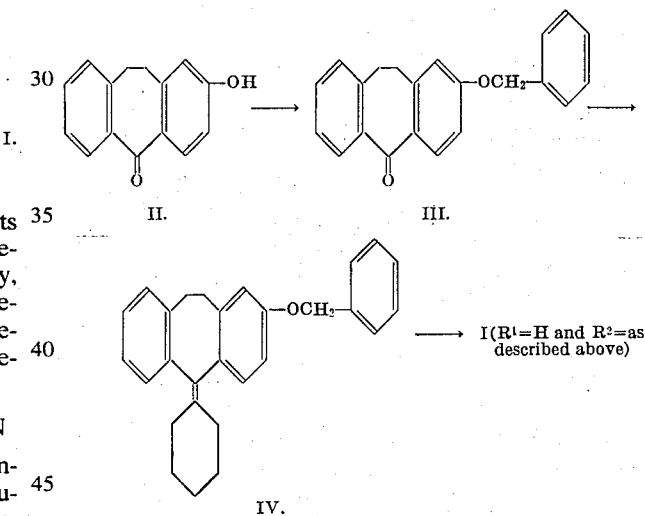

Fig. 1

In practising the above process, 2-hydroxy-10,11-dihydro5H-dibenzo[a,d]cyclohepten-5-one (II), described by J. W. Schulenberg and S. Archer, U.S. Pat. No. 3,350,405, issued Oct. 31, 1967, is allowed to react in an inert solvent with a molar excess of a benzyl halide, such as benzyl chloride, benzyl bromide or benzyl iodide, in the presence of a proton acceptor at temperatures ranging from 0°C to the boiling point of the mixture and for periods of time ranging from one to 72 hours. Preferred conditions for this reaction include the use of sodium methoxide as a proton acceptor, ethanol as the inert solvent, a reaction time of 18 to 24 hours and temperatures ranging from 60°C to the boiling point of the mixture.

The benzyl ether of formula III, obtained in the manner just described, is then converted to the benzyl ether of formula IV by treatment with a cyclohexyl magnesium halide, such as cyclohexyl magnesium bromide, cyclohexyl magnesium chloride or cyclohexyl magnesium iodide, in an inert solvent at temperatures ranging from −10°C to the boiling point of the mixture from 1 to 24 hours, followed by treatment with an acid during the workup of the reaction. Preferred conditions for this reaction include the use of tetrahydrofuran or ether as the solvent, temperature ranging from 5°C to room temperature and reaction times from 4 to 6 hours followed by treatment with a strong mineral acid, for example, sulfuric acid.

Alternatively, the benzyl ether of formula III may be converted to the benzyl ether of formula IV by treatment of the former compound with cyclohexyllithium in an inert solvent, for example, tetrahydrofuran, at temperatures ranging initially from −20° to 30°C, preferably 0° to 10°C, for a period of time of 1 to 3 hours, followed by an extended reaction period at 10° to 40°C, preferably at about room temperature, and a reaction time of 6 to 48 hours, preferably 16 to 24 hours.

Subsequent hydrogenolysis of the benzyl ether (IV) readily affords the dibenzocycloheptene derivative, the compound of this invention of formula I in which $R^1$ is hydrogen and $R^2$ is hydroxyl. This hydrogenolysis is effected by exposing a solution of the benzyl ether IV in the inert solvent, for example, ethyl acetate, to an atmosphere of hydrogen in the presence of a catalyst, for example, palladium on charcoal, until the theoretical uptake of hydrogen by the reaction mixture is completed.

The compound of formula I in which $R^1$ is hydrogen and $R^2$ is hydroxyl may be converted to its corresponding acylated derivatives, the compounds of formula I in which $R^1$ is hydrogen and $R^2$ is a lower acyloxy as described above, by treatment with an excess of the appropriate acid anhydride, preferably in the presence of a strong acid, for example, sulfuric acid.

The aminoethoxy ether compounds of formula I in which $R^1$ is hydrogen and $R^2$ is dimethylaminoethoxy, diethylaminoethoxy, pyrrolidinoethoxy, piperidinoethoxy or morpholinoethoxy may be prepared by treating the compound of formula I in which $R^1$ is hydrogen and $R^2$ is hydroxyl, prepared as described above, with the appropriate 2-aminoethyl chloride hydrochloride, described by D. J. Collins and J. J. Hobbs, Aust. J. Chem., 20, 1413 (1967), in the presence of an excess of a proton acceptor, for example, potassium carbonate and an inert solvent, for example, acetone. The rate of formation of the aminoethoxy ethers of formula I in this reaction is proportional to the reaction time and temperature employed; suitable ranges of time and temperatures are from 6 to 48 hours, and from room temperature to the boiling point of the mixture, respectively. Alternatively, corresponding 2-aminoethyl bromides or 2-aminoethyl iodides may be used in this step of the process instead of the appropriate 2-aminoethyl chloride, to give the above aminoether of formula I.

The amino ethers of formula I, described above, are capable of forming acid addition salts with pharmaceutically acceptable acids. Such acid addition salts are included within the scope of this invention.

The dibenzocycloheptene derivatives of this invention of formula I in which $R^1$ and $R^2$ each represent the same radical selected from the radicals described for $R^2$ in the first instance may be prepared by the process illustrated by FIG. 2.

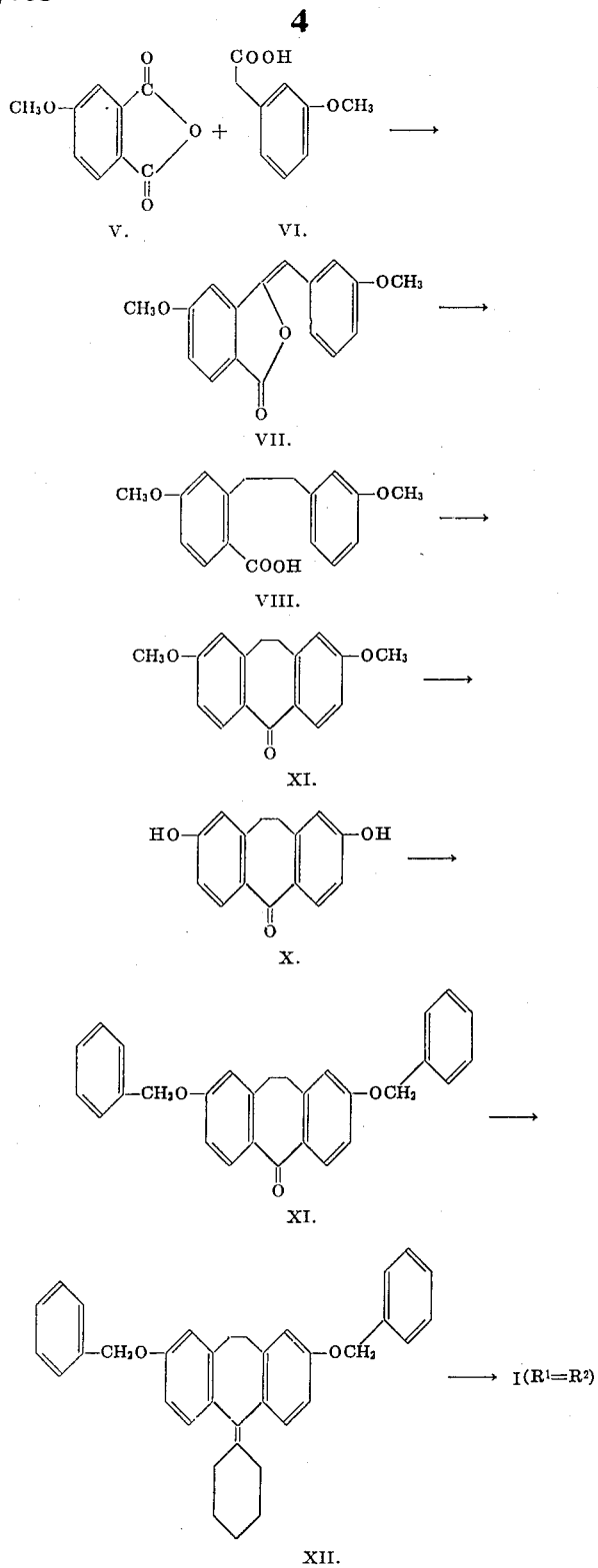

Fig. 2

In practising the process illustrated by FIG. 2, a mixture of 4-methoxyphthalic anhydride (V) described by C. Weizmann et al., J. Chem. Soc., 1367 (1935), is heated with commercially available 3-methoxyphenylacetic acid (VI) in the presence of sodium acetate to afford the benzalphthalide compound (VII). This reaction is performed most expeditiously by heating the reaction mixture between 200° and 300°C for one-half to 5 hours.

The benzalphthalide compound thus obtained is then brought into contact with a basic liquid medium, for example, aqueous sodium hydroxide, for 1 to 4 hours at temperatures ranging from 60° to 90°C. Thereafter the mixture is adjusted to a pH of about 8 to 10 with a strong acid, for example, hydrochloric acid. Insoluble by-products may be removed by filtration at this point. A noble metal catlayst, such as, for example, palladium on charcoal is now added to the mixture. The resulting mixture then exposed to hydrogen in a closed system until about two moles of hydrogen are absorbed by the reaction mixture. Although temperature is not a critical factor, elevated temperatures between the 70° to 100°C may be used to expedite the time needed for the uptake of hydrogen. In this manner, the dimethoxybenzoic acid compound (VIII) is obtained.

Subsequent conversion of the dimethoxybenzoic acid compound (VIII) to the dimethoxyketone (IX) may be effected by a cyclization procedure using polyphosphoric acid as the agent. Again, this reaction may be expedited by using elevated temperatures, for example 60° to 120°C from about one-half to 3 hours. It is preferably to perform this cyclization under anhydrous conditions.

In the next step of this process, the dimethoxyketone (IX) is converted to the dihydroxyketone (X) by contact with pyridine hydrochloride at temperatures ranging from 125° to 250°C for a period ranging from 1 to 6 hours. A reaction time and temperature of 2 hours and 200°C, respectively, are quite suitable for this reaction.

The remaining steps of the process illustrated in FIG. 2, X → XI → XII → the compound of this invention of formula I in which $R^1$ and $R^2$ each represent a hydroxyl, may be accomplished by the procedure described above for the analogous steps, II → III → IV → the compound of this invention of formula I in which $R^1$ is hydrogen and $R^2$ is hydroxyl. In this case due regard is given to the fact that the amount of reagents are proportioned according to the molecular weight of the intermediates, X, XI, XII and the number of functional groups involved in each step.

Likewise, and with the same regard, the compound of this invention of formula I in which $R^1$ and $R^2$ each are hydroxy may be converted to the compounds of formula I in which $R^1$ and $R^2$ are each a lower acyloxy or $R^1$ and $R^2$ are each a dimethylaminoethoxy, diethylaminoethoxy, pyrrolidinoethoxy, piperidinoethoxy, or morpholinoethoxy, in the same manner as described above for the conversion of the compound of this invention of formula I in which $R^1$ is hydrogen and $R^2$ is hydroxyl to the compounds of formula I in which $R^1$ is hydrogen and $R^2$ is a lower acyloxy or $R^1$ is hydrogen and $R^2$ is a dimethylaminoethoxy, diethylaminoethoxy, pyrrolidinoethoxy, piperidinoethoxy or morpholinoethoxy, respectively. The corresponding acid addition salts of these aminoethoxy ether compounds with pharmaceutically acceptable acids are also included within the scope of this invention.

The following Examples will illustrate further this invention.

EXAMPLE 1

A mixture consisting of 10,11-dihydro-2-hydroxy-5H-dibenzo-[a,d]cyclohepten-5-one (17.0 g, 0.07 mole), sodium methoxide (7.6 g, 0.14 mole) and benzyl chloride (17.7 g, 0.14 mole) in 200 ml of anhydrous ethanol is refluxed for 24 hours. The mixture is then poured into 1 liter of water and extracted with chloroform. The extract is washed with water, dried ($MgSO_4$), and concentrated. The residue is recrystallized from ethanol to give 2-benzyloxy-10,11-dihydro-5H-dibenzo[a,d]cyclohepten-5-one (III), m.p. 77°C, $\gamma_{max}^{CHCl_3} 1636$ cm$^{-1}$.

In the same manner, but using an equivalent amount of benzyl bromide or benzyl iodide, instead of benzyl chloride, the same product is obtained.

EXAMPLE 2

Cyclohexyl magnesium chloride (0.32 mole, 160 ml of a 1M solution in tetrahydrofuran) is cooled to 5°C under nitrogen and 2-benzyloxy-10,11-dihydro-5H-dibenzo[a,d]cyclohepten-5-one (12.6 g, 0.04 mole), prepared as described in Example 1, in 80 ml of freshly distilled tetrahydrofuran is added dropwise with stirring at 5°C over a period of half an hour. Stirring is continued while the reaction mixture rises to room temperature (approx. 4 hours). A nitrogen atmosphere is maintained throughout. The Grignard complex is decomposed by addition to 5N sulfuric acid (300 ml) and the product is extracted with benzene. The extract is washed with 5 percent sodium bicarbonate, water and dried ($MgSO_4$). Evaporation of the solvent yields an oil. This oil is dissolved in ethanol (500 ml), concentrated $H_2SO_4$ (75 ml) is added and the mixture is heated on a steam bath for 1 hour. The ethanol is removed by distillation and the residue dissolved in benzene, washed with 5 percent $NaHCO_3$ and water and dried. Evaporation of the benzene yields an oil which is filtered through a column of silica gel with hexane-benzene (1:1).

The eluate is crystallized from methanol to afford 2-benzyloxy-5-cyclohexylidene-10,11-dihydro-5H-dibenzo[a,d]cyclo-heptene(IV), m.p. 104°C, nmr ($CDCl_3$) δ 3.8 to 2.4(multiplet,4H), 2.2(4H), 1.5(6H).

In the same manner, but using an equivalent amount of cyclohexyl magnesium bromide or cyclohexyl magnesium iodide instead of cyclohexyl magnesium chloride, the same product is obtained.

Alternatively, the same product may be obtained by using an equivalent amount of 2-benzyloxy-10,11-dihydro-5H-dibenzo[a,d]-cyclohepten-5-one instead of 10,11-dihydro-2,8-dimethoxy-5H-dibenzo[a,d]cyclohepten-5-one, according to the manipulative procedure described in Example 13, Procedure B.

EXAMPLE 3

2-Benzyloxy-5-cyclohexylidene-10,11-dihydro-5H-dibenzo-[a,d]cycloheptene (5.0 g, 0.13 mole), prepared as described in Example 2, is dissolved in ethyl acetate (200 ml) and 10 percent palladium on charcoal (1.0 g) is added. The mixture is hydrogenated at approximately 15 p.s.i. pressure. The theoretical uptake is observed in 24 hours. The catalyst is removed by filtration. Distillation of the solvent from the filtrate gives pure white crystals. Recrystallization from the benzene-hexane affords 5-cyclohexylidene-10,11-dihydro-5H-dibenzo[a,d]cyclohepten-2-ol (I, $R^1$ = H and $R^2$ = OH), m.p. 155°C, nmr ($CDCl_3$)δ3.7 to 2.4 (multiplet,4H), 2.2(4H), 1.6(6H).

EXAMPLE 4

Acetic anhydride (30 ml) and concentrated sulfuric acid (4 drops) are added to a solution of 5- cyclohexylidene-10,11-dihydro-5H-dibenzo[a,d]cyclohepten-2-ol (5.0 g), prepared as described in Example 3, in benzene (250 ml). The solution is warmed on a steam bath for 1 hour. After cooling, washing with water and drying (MgSO$_4$), the solvent is removed by distillation and the last traces of acetic anhydride are removed by the addition of ethanol and subsequent evaporation. The resulting oil is dissolved in methanol-benzene (1:9) and filtered through a column of silica gel. The eluate, a clear gum homogeneous by thin layer chromatography is 5-cyclohexylidene-10,11-dihydro-5H-dibenzo[a,d]cyclohepten-2-ol acetate (I, R$^1$ = H and R$^2$ = OCOCH$_3$), nmr (CDCl$_3$) δ2.23(4H), 2.20(3H), 1.6(6H).

In the same manner, but using an equivalent amount of propionic anhydride or butyric anhydride instead of acetic anhydride, 5-cyclohexylidene-10,11-dihydro-5H-dibenzo[a,d]cyclohepten-2-ol propionate (I, R$^1$ = H and R$^2$ = OCOCH$_2$CH$_3$) and 5-cyclohexylidene-10,11-dihydro-5H-dibenzo[a,d]cyclohepten-2-ol butyrate (I, R$^1$ = H and R$^2$ = COCH$_2$CH$_2$CH$_3$) are obtained, respectively.

EXAMPLE 5

Potassium carbonate (6.84 g), diethylaminoethyl chloride hydrochloride (8.4 g) and 5-cyclohexylidene-10,11-dihydro-5H-dibenzo[a,d]cyclohepten-2-ol (6.0 g), prepared as described in Example 3, are combined in acetone (125 ml). The resulting suspension is boiled for 24 hours with vigorous mechanical stirring. Inorganic material is removed by filtration and the acetone is evaporated to give an oil. The oil is dissolved in benzene, washed with water and dried over sodium sulfate. After the removal of the solvent, the oily residue is purified by eluting from a column of silica gel with ethyl acetate-benzene (3:7).

The eluate, 2-(5-cyclohexylidene-10,11-dihydro-5H-dibenzo[a,d]cyclohepten-2-yloxy)ethyldiethylamine [I, R$^1$ = H and R$^2$ = OCH$_2$CH$_2$N(CH$_2$CH$_3$)$_2$] is homogeneous by thin layer chromatography, nmr (CDCl$_3$) 2.2(4H), 1.6(6H). The corresponding hydrochloric acid addition salt of this product is prepared by dissolving the product in ether and slowly adding ethereal hydrogen chloride. The resulting precipitate is collected and recrystallized from acetone-ether to give the corresponding hydrochloric acid addition salt, m.p. 118°C.

In the same manner, but using an equivalent amount of the 2-aminoethyl chloride hydrochlorides, 2-dimethylaminoethyl chloride hydrochloride, 2-pyrrolidinoethyl chloride hydrochloride, 2-piperidinoethyl chloride hydrochloride or 2-morpholinoethyl chloride hydrochloride, instead of 2-diethylaminoethyl chloride hydrochloride, 2-(5-cyclohexylidene-10,11-dihydro-5H-dibenzo[a,d]cyclohepten-2-yloxy)ethyldimethylamine, 1-[2-(5-cyclohexylidene-10,11-dihydro-5H-dibenzo[a,d]cyclohepten-2-yloxy)-ethyl]pyrrolidine, 1-[2-(5-cyclohexylidene-10,11-dihydro-5H-dibenzo[a,d]cyclohepten-2-yloxy)ethyl]piperidine, and 4-[2-(5-cyclohexylidene-10,11-dihydro-5H-dibenzo[a,d]cyclohepten-2-yloxy)-ethyl]morpholine, are obtained respectively.

The hydrochloric acid addition salts of the latter four compounds are prepared in the same manner as described above for the hydrochloric acid addition salt of the first product of this Example.

EXAMPLE 6

4-Methoxyphthalic anhydride (V, 24.0 g, 0.14 mole), 3-methoxyphenylacetic acid (VI, 25.0 g, 0.15 mole) and anhydrous sodium acetate (0.7 g) are mixed intimately and heated to 265°C for 2.5 hours. The reaction mixture is cooled and crystallized from ethanol and then acetonitrile using a charcoal treatment. In this manner, 5-methoxy-3-(3-methoxybenzal)phthalide (VII), m.p. 141° to 142°C, $\gamma_{max}^{CHCl_3}$ 1770 cm$^{-1}$, is obtained.

EXAMPLE 7

5-Methoxy-3-(3-methoxybenzyl)phthalide (42.7 g, 0.15 mole), prepared as described in Example 6, is suspended in 600 ml of water and sodium hydroxide pellets (30 g) are added. The mixture is stirred and heated at 85° to 90°C for 2 hours. The resulting brown solution is diluted with 500 ml of water and the pH is adjusted to 8.5 with 10 percent hydrochloric acid (use pH meter). It is then cooled to room temperature and filtered. The filtrate is hydrogenated with 4.3 g of 10 percent palladium on charcoal at 95°C in a 1 gallon autoclave. The initial operating pressure is 65 p.s.i. After 20 hours the pressure has fallen to 23 p.s.i. (equivalent to 4.8 l. of H$_2$ at S.T.P.). The pressure is reset at 50 p.s.i. and after 23 hours it has fallen to 36 p.s.i. (eq. to 1.6 l. of H$_2$). Total H$_2$ uptake: 6.4 l., (93.5 percent of theoretical: 6.85 l.). The solution is filtered, acidified to pH2 and extracted with chloroform to give the crude product. The crude product is crystallized from ethanol to give 4-methoxy-2-(3-methoxy-β-phenethyl)benzoic acid (VIII) m.p. 124°C, λ$_{max}^{EtOH}$ 255 μ (ε=14,400).

EXAMPLE 8

Polyphosphoric acid, 130 g., is weighed into a 2-necked, round bottomed flask and 15.0 g of 4-methoxy-2-(3-methoxy-β-phenethyl)benzoic acid, prepared as described in Example 7, is added. The mixture is protected from moisture by drying tubes, stirred mechanically and heated on a steam bath for 45 minutes. It is then poured into an ice-water mixture and the resulting white precipitate is extracted with chloroform. The organic phase is washed with water, dried over sodium sulfate and evaporated. The residue is dissolved in benzene-hexane (1:1), treated with charcoal and filtered through a column containing neutral alumina (activity 2). Concentration of the eluent affords 10,11-dihydro-2,8-dimethoxy-5H-dibenzo[a,d]cyclohepten-5-one (IX), m.p. 120°C, λ$_{max}^{EtOH}$ 313 μ (ε=21,600).

EXAMPLE 9

10,11-Dihydro-2,8-dimethoxy-5H-dibenzo[a,d]cyclohepten-5-one (0.2 g), prepared as described in Example 8, and freshly distilled pyridine hydrochloride (1.0 g) are heated in an oil bath at 200° external temperature for 2 hours. After cooling, the resulting solid is dissolved in water and extracted with ether. The ether phase is washed with water, dried over magnesium sulfate and evaporated to give a solid which gave a positive ferric chloride test. The solid is dissolved in methanolbenzene (9:1) and passed through a column containing silica gel. Concentration of the eluent affords 10,11-dihydro-2,8-dihydroxy-5H-dibenzo[a,d]cyclohepten-5-one (X), m.p. 273° to 274°C, nmr (CDCl$_3$) δ 6.7(2H), 3.9(2H), 3.7-2.4(multiplet, 4H).

EXAMPLE 10

A reaction mixture consisting of 10,11-dihydro-2,8-dihydroxy-5H-dibenzo[a,d]cyclohepten-5-one (4.5 g, 0.0185 mole), prepared as described in Example 9, benzyl chloride (21.5 g., 0.17 mole) and sodium methoxide (8.1 g, 0.15 mole) in 400 ml of anhydrous ethanol is refluxed for 24 hours. After cooling to room temperature, the mixture is dissolved in water and extracted with chloroform. The organic phase is washed to neutrality with water, dried (MgSO$_4$) and treated with charcoal. After evaporation of the CHCl$_3$ the product crystallizes. The crystalline product is dissolved in ethyl acetate-benzene (1:99) and passed through a column of silica gel. The eluate is recrystallized from acetonitrile to give 2,8-dibenzyloxy-10,11-dihydro-5H-dibenzo[a,d]cyclohepten-5-one (XI), m.p. 135°C, $\lambda_{max}^{EtOH}$ 314 μ ($\epsilon$=22,800).

Subsequent conversion of the dimethoxybenzoic acid compound (VIII) to the dimethoxyketone (IX) may be effected by a cyclization procedure using polyphosphoric acid as the agent. Again, this reaction may be expedited by using elevated temperatures, for example 60° to 120°C from about one-half to 3 hours. It is preferable to perform this cyclization under anhydrous conditions.

EXAMPLE 11

The manipulative procedure of Example 2 is followed using 2,8-dibenzyloxy-10,11-dihydro-5H-dibenzo[a,d]cyclohepten-5-one (4.0 g, 0.0104 mole), prepared as described in Example 10, instead of 2-benzyloxy-10,11-dihydro-5H-dibenzo[a,d]cyclohepten-5-one, and 0.16 mole (23 ml) of a 1M solution of cyclohexylmagnesium chloride in tetrahydrofuran. In this manner, the product, 5-cyclohexylidene-2,8-dibenzyloxy-10,11-dihydro-5H-dibenzo[a,d]cycloheptene (XII), m.p. 140°, nmr (CDCl$_3$) 3.7-2.4(multiplet,4H), 2.2(4H), 1.6(6H), is obtained.

Alternatively, the same product may be obtained by using an equivalent amount of 2,8-dibenzyloxy-10,11-dihydro-5H-dibenzo[a,d]cyclohepten-5-one instead of 10,11-dihydro-2,8-dimethoxy-5H-dibenzo[a,d]cyclohepten-5-one, according to the manipulative procedure described in Example 13, Procedure B.

EXAMPLE 12

5-Cyclohexylidene-2,8-dibenzyloxy-10,11-dihydro-5H-dibenzo[a,d]cycloheptene (3.1 g, 0.0065 mole), prepared as described in Example 11, in ethyl acetate (200 ml) containing 10 percent palladium on charcoal (650 mg) is hydrogenated at atmospheric pressure. The theoretical uptake of hydrogen is observed in 24 hours and the catalyst is removed by filtration through celite. Evaporation of the filtrate yields white crystals which on recrystallization from ether-hexane gives 5-cyclohexylidene-10,11-dihydro-5H-dibenzo[a,d]cycloheptene-2,8-diol (I, R$^1$ and R$^2$ = OH), m.p. 266°, $\lambda_{max}^{EtOH}$ 244 μ ($\epsilon$=17,100).

EXAMPLE 13

Procedure A:

The manipulative procedure of Example 2 is followed using 10,11-dihydro-2,8-dimethoxy-5H-dibenzo[a,d]cyclohepten-5-one (1.0 g, 0.0037 mole), prepared as described in Example 8, instead of 2-benzyloxy-10,11-dihydro-5H-dibenzo[a,d]cyclohepten-5-one, and 0.08 mole, 11.5 ml of a 1M solution of cyclohexylmagnesium chloride in tetrahydrofuran. In this manner, the product, 5-cyclohexylidene-10,11-dihydro-2,8-dimethoxy-5H-dibenzo[a,d]cycloheptene, m.p. 126°C, $\lambda_{max}^{EtOH}$ 247 μ ($\epsilon$=22,850), is obtained after recrystallization from ethanol.

Procedure B:

All glassware is dried at 110° overnight and the reaction is done under helium.

Cyclohexyllithium, 150 ml of a 0.5 mole solution in toluene is added to 150 ml of dry tetrahydrofuran and cooled to 0°C. 10,11-dihydro-2,8-dimethoxy-5H-dibenzo[a,d]cyclohepten-5-one (15.0 g., 0.056 mole) prepared as described in Example 8, in 60 ml of dry tetrahydrofuran is added dropwise with stirring over a period of 2 hours at 0°C. The reaction mixture is stirred at 0°C for 2 hours and at room temperature overnight. The mixture is then decomposed by shaking with 25 percent sulfuric acid for 5 minutes and then extracted with benzene. The benzene solution is washed with 5 percent sodium bicarbonate and water, dried over sodium sulfate and evaporated to yield an oil. This oil is dissolved in ethanol containing 20 ml of concentrated hydrochloric acid and boiled for 1 hour. The ethanol is evaporated and a benzene solution of the residue is washed with 5 percent sodium bicarbonate and water, dried over sodium sulfate and evaporated to yield an oil. The oil is dissolved in benzenehexane (1:99) and passed through a column of neutral alumina (activity No. 2). The eluate is crystallized from ethanol to give a product identical to the product obtained by Procedure A described above.

EXAMPLE 14

A mixture of 5-cyclohexylidene-10,11-dihydro-2,8-dimethoxy-5H-dibenzo[a,d]cycloheptene (0.6g, .0018 mole), 5.0 g of potassium hydroxide pellets and 50 ml of triethyleneglycol is heated and stirred at 200°C (internal temperature) for 3 hours. The cooled mixture is suspended in water and extracted with ether. The ether phase is washed with water, dried (MgSO$_4$), and evaporated to give a solid. The solid is dissolved in methanol-benzene (9:1) and passed through a column of silica gel. Concentration of the eluent affords a product identical to 5-cyclohexylidene-10,11-dihydro-5H-dibenzo[a,d]cycloheptene-2,8-diol, described in Example 12.

EXAMPLE 15

The manipulative procedure of Example 4 is followed using an equivalent amount of 5-cyclohexylidene-10,11-dihydro-5H-dibenzo[a,d]cycloheptene-2,8-diol, prepared as described in Examples 12 and 14, instead of 5-cyclohexylidene-10,11-dihydro-5H-dibenzo[a,d]cyclohepten-2-ol. In this manner, depending on the choice of acid anhydride, acetic anhydride, propionic anhydride or butyric anhydride, the diacetate, dipropionate and dibutyrate of 5-cyclohexylidene-10,11-dihydro-5H-dibenzo[a,d]-cycloheptene-2,8-diol are obtained, respectively.

EXAMPLE 16

Following the manipulative procedure of Example 5, but using an equivalent amount of 5-cyclohexylidene-10,11-dihydro-5H-dibenzo[a,d]cycloheptene-2,8-diol, prepared as described in Examples 12 and 14, instead of 5-cyclohexylidene-10,11-dihydro-5H-dibenzo[a,d]cyclohepten-2-ol, and using respectively 2-diethylaminoethyl chloride hydrochloride, 2-dimethylaminoethyl chloride hydrochloride, 2-pyrrolidinoethyl chloride hydrochloride, 2-piperidinoethyl chloride hydrochloride, or 2-morpholinoethyl chloride hydrochloride, 5-cyclohexylidene-2,8-bis(2-diethylaminoethoxy)-10,11-dihydro-5H-dibenzo[a,d]-cycloheptene, 5-cyclohexylidene-2,8-bis (2-dimethylaminoethoxy)-10,11-dihydro-5H-dibenzo[a,d]cycloheptene, 5-cyclohexylidene-2,8-bis(2-pyrrolidinoethoxy)-10,11-dihydro-5H-dibenzo[a,d]cycloheptene, 5-cyclohexylidene-2,8-bis(2-piperidinoethoxy)-10,11-dihydro-5H-dibenzo[a,d]cycloheptene and 5-cyclohexylidene-2,8-bis(2-morpholinoethoxy)10,11-dihydro-5H-dibenzo[a,d]-cycloheptene are obtained.

The hydrochloric acid addition salts of the latter five compounds are prepared in the same manner as described for the hydrochloric acid addition salts of the first product of Example 5.

I claim:
1. A compound of the formula:

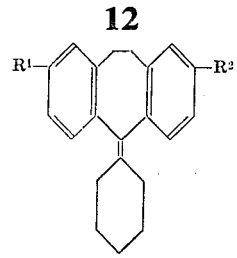

wherein $R^1$ represents hydrogen and $R^2$ is benzyloxy, or $R^1$ and $R^2$ each represent the same radical selected from the group which consists of methoxy and benzyloxy.

2. 2-Benzyloxy-5-cyclohexylidene-10,11-dihydro-5H-dibenzo[a,d]-cycloheptene as claimed in claim 1.

3. 5-Cyclohexylidene-2,8-dibenzyloxy-10,11-dihydro-5H-dibenzo[a,d]-cycloheptene as claimed in claim 1.

4. 5-Cyclohexylidene-10,11-dihydro-2,8-dimethoxy-5H-dibenzo[a,d]-cycloheptene as claimed in claim 1.

* * * * *